United States Patent
Kim et al.

(10) Patent No.: US 11,196,793 B2
(45) Date of Patent: Dec. 7, 2021

(54) METHOD AND APPARATUS FOR ADAPTIVE STREAMING BASED ON HYBRID TCP AND UDP IN MULTIPLE NARROWBAND WIRELESS COMMUNICATION ENVIRONMENT

(71) Applicant: AGENCY FOR DEFENSE DEVELOPMENT, Daejeon (KR)

(72) Inventors: Kyungwoo Kim, Daejeon (KR); Donghyun Kim, Daejeon (KR); No-Hyerok Park, Daejeon (KR); Jeung Won Choi, Dajeon (KR); Jong Hwan Ko, Suwon-si (KR); Hwangjun Song, Pohang-si (KR); Jaewoo Kim, Seongnam-si (KR); Hyun Park, Seongnam-si (KR); Jongman Lee, Seongnam-si (KR); Yunmin Go, Pohang-si (KR)

(73) Assignee: Agency for Defense Development, Daejeon (KR)

( * ) Notice: Subject to any disclaimer, the term of this patent is extended or adjusted under 35 U.S.C. 154(b) by 0 days.

(21) Appl. No.: 16/792,037

(22) Filed: Feb. 14, 2020

(65) Prior Publication Data

US 2020/0274909 A1    Aug. 27, 2020

(30) Foreign Application Priority Data

Feb. 14, 2019    (KR) .................. 10-2019-0017121

(51) Int. Cl.
*H04L 29/06*    (2006.01)
*H04L 12/26*    (2006.01)

(52) U.S. Cl.
CPC ........ *H04L 65/608* (2013.01); *H04L 43/0841* (2013.01); *H04L 69/16* (2013.01)

(58) Field of Classification Search
CPC .... H04L 65/608; H04L 43/0841; H04L 69/16
(Continued)

(56) References Cited

U.S. PATENT DOCUMENTS 7,440,805 B2 * 10/2008 Holmquist ......... A61N 1/37254
607/32
8,363,573 B2 *  1/2013 Moore ................ H04L 12/1818
370/260

(Continued)

FOREIGN PATENT DOCUMENTS

| JP | 2001-298479 A | 10/2001 |
| KR | 10-2001-0038203 A | 5/2001 |
| KR | 10-2016-0081944 A | 7/2016 |

OTHER PUBLICATIONS

Go et al., Hybrid TCP/UDP-Based Enhanced HTTP Adaptive Streaming System With Multi-Homed Mobile Terminal, IEEE Transactions on Vehicular Technology, vol. 68, No. 5, 5114-5128 (May 2019). (Year: 2019).*

(Continued)

*Primary Examiner* — David P Zarka
(74) *Attorney, Agent, or Firm* — Knobbe Martens Olson & Bear LLP (57) ABSTRACT

An apparatus for adaptive streaming in multiple narrowband wireless communication environment comprises a communication unit configured to perform multi-communication with a server using a TCP and an UDP, a network monitor unit configured to collect state information on each of a plurality of narrowband networks, and a parameter control unit configured to: based on the collected state information on each of the plurality of narrowband networks, select a quality of video segment to be requested and one of the TCP protocol and the UDP protocol to be used in each of the plurality of narrowband networks, or determine a data size (Continued)

of redundant data for data loss restoration for each of the plurality of narrowband networks.

12 Claims, 5 Drawing Sheets

(58) Field of Classification Search
USPC .......................................................... 709/219
See application file for complete search history.

(56) References Cited

U.S. PATENT DOCUMENTS

| | | | | |
|---|---|---|---|---|
| 8,711,884 | B2* | 4/2014 | Kure | H04L 1/0007 |
| | | | | 370/503 |
| 9,019,815 | B2* | 4/2015 | Eckert | H04L 45/28 |
| | | | | 370/228 |
| 9,197,899 | B2* | 11/2015 | Hiriyannaiah | H04N 19/132 |
| 9,326,307 | B2* | 4/2016 | Erickson | H04W 88/02 |
| 9,331,815 | B2* | 5/2016 | Muramoto | H04L 65/403 |
| 9,350,679 | B2* | 5/2016 | Mani | H04L 47/34 |
| 9,590,821 | B2* | 3/2017 | Brandstatter | H04L 69/22 |
| 9,781,028 | B2* | 10/2017 | Ohnishi | H04L 45/3065 |
| 10,373,490 | B2* | 8/2019 | Lee | G08G 1/091 |
| 10,778,813 | B2* | 9/2020 | Chiang | H04L 65/1063 |
| 10,833,972 | B2* | 11/2020 | Vaughan | H04L 45/06 |
| 2004/0153858 | A1* | 8/2004 | Hwang | H04L 12/4641 |
| | | | | 714/43 |
| 2010/0278068 | A1* | 11/2010 | Nobert | H04W 24/10 |
| | | | | 370/253 |
| 2016/0198021 | A1* | 7/2016 | Mooney | H04L 69/24 |
| | | | | 370/467 |
| 2018/0309808 | A1* | 10/2018 | Andon | H04L 65/4053 |

OTHER PUBLICATIONS

Office Action of corresponding Korean Patent Application No. 10-2019-0017121—5 pages (dated Jan. 30, 2020).

* cited by examiner

METHOD AND APPARATUS FOR ADAPTIVE STREAMING BASED ON HYBRID TCP AND UDP IN MULTIPLE NARROWBAND WIRELESS COMMUNICATION ENVIRONMENT

TECHNICAL FIELD

The present disclosure relates to an adaptive streaming service, and, more particularly, to a device for transmitting and receiving a hybrid TCP/UDP based adaptive streaming service through multi-communication under a narrowband environment and a method thereof.

BACKGROUND

The MPEG (MPEG-2) standardized an HTTP adaptive streaming technique "MPEG Dynamic Adaptive Streaming over HTTP (MPEG-DASH)" in April 2012. A server in the MPEG-DASH technique stores video segments and metadata files called Media Presentation Description (MPD).

In the MPEG-DASH technique, a device, first, requests the server to transmit the MPD and receives the MPD. The device analyzes the received MPD. Further, the device analyzes network states and determines a bandwidth to be required when receiving the video segments based on the analysis results. Next, the device, considering analysis results regarding the MPD and the network states and the determined bandwidth, etc., requests the server to transmit the video segments and receives the video segments. In this case, the device receives the video segments from the server by utilizing a TCP, in other words, by utilizing a singular wireless network.

Narrowband networks such as a LoRa and an LPWAN become spread to transmit sensor data. In the narrowband networks, the sensor data is transmitted through an uplink and a control message is transmitted through a downlink. Further, asymmetric uplink/downlink that a bandwidth for the downlink is even more limited than a bandwidth for the uplink are utilized for efficient usage for a limited bandwidth. This property, when data is transmitted through the TCP in the narrowband networks, incurs not only excessive overhead by re-transmit requests through Acknowledgement (ACK) messages, but also delays or loss for the ACK messages. Therefore, in case of packet loss, a throughput is easily decreased by reducing a congestion window size.

Herein, when data recorded through an image sensor is transmitted through the narrowband networks, a requisite bandwidth is determined based on network states and transmitting/receiving buffer states. In this case, there is a limit to a determinable range of the requisite bandwidth. The reason is that the singular wireless network is utilized when the video segments are received, and the throughput is decreased because of congestion, interference, and attenuation of the narrowband networks when data is transmitted through TCP.

On the other hand, an Internet Engineering Task Force (IETF) suggested a multipath TCP (MPTCP) technique. However, in terms of the MPTCP technique, a Head Of Line (HOL) blocking problem can arise if there is a significant difference of the network states between heterogeneous networks. Further, if the packet loss occurs frequently in a particular network, high-quality streaming can be hard to be provided in the particular network although the MPTCP technique is applied to. The reason is that, in the TCP, the throughput is decreased by reducing the congestion window size when the packet loss occurs.

SUMMARY

Problems to be solved by the present disclosure provide an adaptive streaming method through multiple narrowband wireless communication that energy-efficiently and stably provides a streaming service utilizing multiple narrowband networks simultaneously in narrowband networks where congestion, interference, and attenuation occur, and an adaptive streaming device therefor.

However, it should be noted that the problems to be solved by the present disclosure are not limited to those mentioned above, and other problems to be solved but not mentioned above shall be apparently understood by those skilled in the art to which the present disclosure belongs.

According to one embodiment, apparatus for adaptive streaming in multiple narrowband wireless communication environment comprises a communication unit configured to perform multi-communication with a server using a TCP and an UDP, a network monitor unit configured to collect state information on each of a plurality of narrowband networks, and a parameter control unit configured to: based on the collected state information on each of the plurality of narrowband networks, select a quality of video segment to be requested and one of the TCP protocol and the UDP protocol to be used in each of the plurality of narrowband networks, or determine a data size of redundant data for data loss restoration for each of the plurality of narrowband networks.

Also the collected state information includes at least one of a throughput, a round trip time (RTT), and a packet loss rate (PLR) for each of the plurality of narrowband networks.

Also, the parameter control unit is further configured to: calculate energy efficiency in case of utilizing the TCP and energy efficiency in case of utilizing the UDP for each of the plurality of narrowband networks based on the collected state information, and select a protocol to be utilized for each of the plurality of narrowband networks from among the TCP and the UDP based on comparing the calculated results.

Also, the parameter control unit is configured to determine the data size of the redundant data based on a packet loss rate collected by the network monitor unit.

Also the parameter control unit is further configured to determine, based on the data size of the redundant data determined for each of the plurality of narrowband networks, an amount of data to be transmitted and received through each of the plurality of narrowband networks.

Also, the amount of the data to be transmitted and received for each of the plurality of narrowband networks is determined by utilizing a predetermined algorithm minimizing a total amount of energy consumed when the data is transmitted through the plurality of narrowband networks.

According to one embodiment, an adaptive streaming method performed by a multi-communication control device under a multiple narrowband wireless communication environment comprises collecting state information on each of a plurality of narrowband networks, selecting a protocol to be utilized for each of the plurality of narrowband networks for multi-communication with a server from among a TCP or an UDP based on the collected state information, and determining a data size of redundant data for data loss restoration for each of the plurality of narrowband networks.

Also, the collected state information includes at least one of a throughput, a round trip time (RTT), and a packet loss rate (PLR) for each of the plurality of narrowband networks.

Also, the selecting the protocol to be utilized includes calculating energy efficiency in case of utilizing the TCP and energy efficiency in case of utilizing the UDP for each of the plurality of narrowband networks based on the collected state information; and selecting the protocol to be utilized for each of the plurality of narrowband networks from among the TCP and the UDP based on comparing the calculated results.

Also, the data size of the redundant data is determined based on the collected packet loss rate and a receiving buffer size to satisfy a seamless reproducing condition in the narrowband networks.

Also, the method further comprises determining, based on the data size of the data determined for each of the plurality of narrowband networks, an amount of data to be transmitted and received through each of the plurality of narrowband networks.

Also, the amount of the data to be transmitted and received for each of the plurality of narrowband networks is determined by utilizing a predetermined algorithm minimizing a total amount of energy consumed when data is transmitted or received through each of the plurality of narrowband networks.

According to one embodiment, a computer program which stored in a computer-readable storage medium is programmed to perform including collecting state information on each of a plurality of narrowband networks, selecting a protocol to be utilized for each of the plurality of narrowband networks for multi-communication with a server from among a TCP or an UDP based on the collected state information, and determining a data size of redundant data for data loss restoration for each of the plurality of narrowband networks.

According to one embodiment, a computer-readable storage medium store a computer program programmed to be performed including collecting state information on each of a plurality of narrowband networks, selecting a protocol to be utilized for each of the plurality of narrowband networks for multi-communication with a server from among a TCP or an UDP based on the collected state information, and determining a data size of redundant data for data loss restoration for each of the plurality of narrowband networks.

According to one embodiment, through a multi-communication technique utilizing each of multiple wireless networks simultaneously, communication can be performed energy-efficiently and stably in a narrowband network where a bandwidth is limited.

DETAILED DESCRIPTION

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present invention, if it is determined that detailed description of related known components or functions unnecessarily obscures the gist of the present invention, the detailed description thereof will be omitted. Further, the terminologies to be described below are defined in consideration of the functions of the embodiments of the present invention and may vary depending on a user's or an operator's intention or practice. Accordingly, the definition thereof may be made on a basis of the content throughout the specification.

Figure 1:
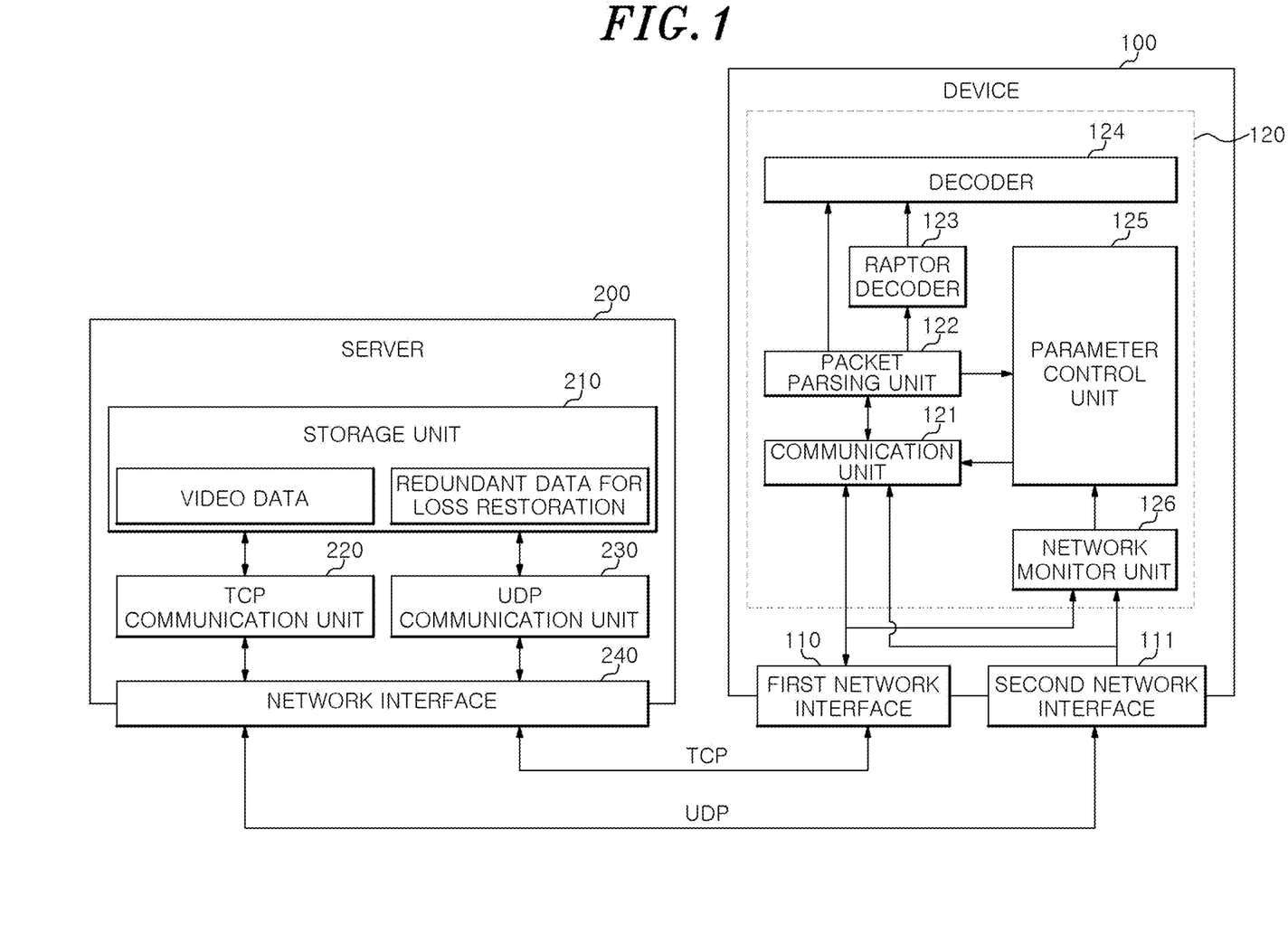
FIG. 1 shows a configuration of a device with a multi-communication control device, and a server performing communication with the device in outline according to one embodiment.

FIG. 1 shows a configuration of a device 100 with a multi-communication control device 120, and a server 200 performing communication with the device 100 in outline according to one embodiment.

Referring to FIG. 1, two or more networks may be simultaneously utilized in communication between the device 100 and the server 200. In other words, multi-communication is performed between the device 100 and the server 200. In this case, a TCP may be utilized for one network and an UDP may be utilized for another network among multiple narrowband networks. There is no doubt that protocols other than the TCP and the UDP may be utilized for each of the networks.

The server 200 may be implemented by a computer and the like providing videos in a streaming way. Further, the device 100 may be implemented by a smartphone, a smartpad, or a personal computer (PC), etc. which are capable of receiving the videos in the streaming way from the server 200 and of reproducing the videos.

Hereinafter, the server 200 is described first. The server 200 includes a storage unit 210, a TCP communication unit 220, an UDP communication unit 230, and a network interface 240 but the configuration of the server 200 is not limited to those illustrated in FIG. 1.

The storage unit 210 may be implemented by a memory and the like storing data. As illustrated in FIG. 1, video data (hereinafter, the video data can be described as a segment) and redundant data for data loss restoration matched with each of the video data are stored in the storage unit 210, and other data not illustrated in FIG. 1 may be further stored. Herein, the redundant data indicates data that is utilized to restore the video data if loss occurs in parts of the video data. The redundant data may be generated based on a raptor code that is described referring to FIG. 2.

Figure 2:
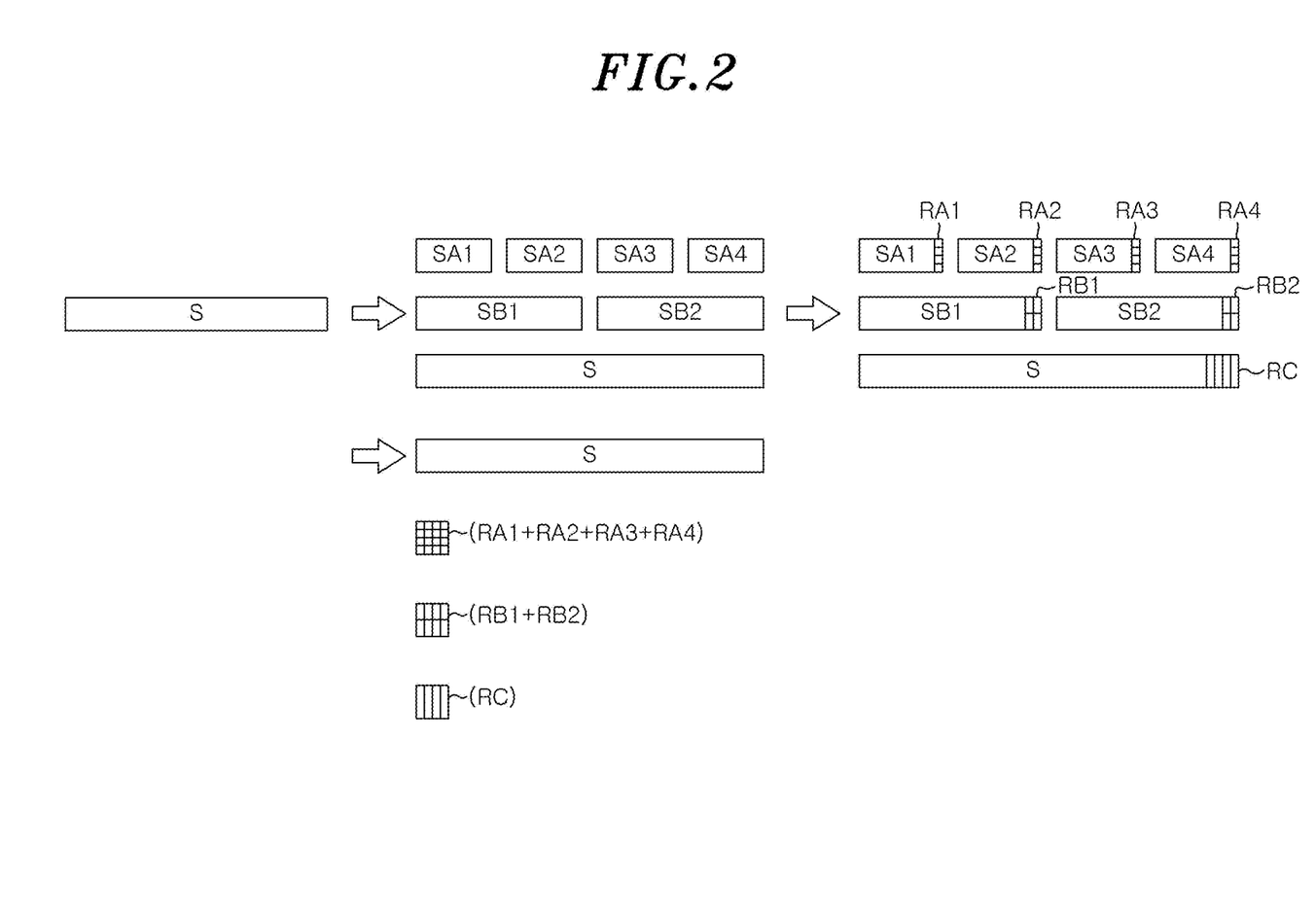
FIG. 2 illustrates file structure regarding raptor-code-based redundant data as an example.

FIG. 2 illustrates video data and a file structure regarding raptor-code (identifier raptor-code)-based redundant data as an example. Referring to FIG. 2, video data "S" may be divided into multiple source blocks. For example, the video data "S" may be divided into four source blocks (SA1 through SA4) or two source blocks (SB1 and SB2). In some cases, the video data "S" may not be divided.

Herein, a source block indicates a base unit comprising the video data. Further, each of the source blocks may include at least one symbol that indicates a base unit comprising the source block. Therefore, if one symbol size (or the amount of data of the one symbol) is "s" and any one source block includes k-symbols, a size of the corresponding source block (or the amount of data of the corresponding source block) is s*k.

On the other hand, the redundant data (RA1 through RA4, RB1 and RB2, or RC, etc.) may be generated for each of the source blocks and combined into each of the source blocks in an interleave way. In this case, an amount of the generated redundant data is adjusted by a code rate (CR). If $k_{enc}$ (for all $k_{enc} \geq k$) is the number of symbols of an encoding block the code rate (CR) is calculated as $k/k_{enc}$.

On the other hand, since generating the redundant data and combining the redundant data themselves are prior arts, detailed descriptions thereof are omitted.

Referring again to FIG. 1, the TCP communication unit 220 may be a wired/wireless communication module capable of providing a HTTP streaming service based on the TCP. The TCP communication unit 220 may be named as a TCP-based HTTP server.

Further, the UDP communication unit 230 may be a wired/wireless communication module capable of providing a HTTP streaming service based on the UDP. The UDP communication unit 230 may be named as a UDP-based HTTP server.

The network interface 240, if the server 200 and the device 100 communicate with each other through multiple networks, interfaces each of the multiple networks with the server 200. Herein, since the network interface 240 itself is a prior art, an additional description thereof is omitted.

Next, the device 100 is described. The device 100 includes a first network interface 110, a second network interface 111, and the multi-communication control unit 120 but the configuration of the device 100 is not limited to those illustrated in FIG. 1.

The first network interface 110 and the second network interface 111 perform identical functions to the network interface 240 included in the server 200. In other words, the first network interface 110 and the second network interface 111 interface the device 100 with each of the multiple networks.

The first network interface 110 may allow the device 100 to perform communication through the TCP and the second network interface 111 may allow the device 100 to perform communication through the UDP, but not limited to those. On the other hand, since the first network interface 110 and the second network interface 111 themselves are prior arts, additional descriptions thereof are omitted.

The multi-communication control unit 120 controls the multi-communication between the device 100 and the server 200. In other words, when the communication is available between the device 100 and the server 200 through the multiple networks, the multi-communication control unit 120 controls the communication through the multiple networks. In this case, the TCP, the UDP, or a variety of other protocols may be utilized for each of the multiple networks as previously described.

The multi-communication control unit 120 includes a communication unit 121, a packet parsing unit 122, a raptor decoder 123, decoder 124, a parameter control unit 125, and a network monitor unit 126, but the configuration of the multi-communication control unit 120 is not limited to those illustrated in FIG. 1. Further, each component of the multi-communication control unit 120 may be implemented in a form of a software module, a hardware module, or a combination of the software module and the hardware module which are performed by a processor.

The communication unit 121 allows the communication between the device 100 and the server 200 by connected with the first network interface 110 or the second network interface 111.

The network monitor unit 126 collects state information on a narrowband network. In other words, when the communication is available between the device 100 and the server 200 through the multiple narrowband networks, the network monitor unit 126 collects the state information on each of the multiple narrowband networks. The network monitor unit 126 may collect the state information on each of the multiple narrowband networks from each of the first network interface 110 and the second network interface 111 by connected with the first network interface 110 or the second network interface 111.

Collectible information, for each of the multiple networks, by the network monitor unit 126 may include, but not limited to, at least one of a throughput, a Round Trip Time (RTT), and a packet loss rate (PLR.)

The packet parsing unit 122 parses packets. For example, the packet parsing unit 122 may parse the video data or the redundant data.

The raptor decoder 123 decodes the redundant data encoded based on the raptor code.

The decoder 124 decodes the video data, which is encoded in a predetermined way, or a variety of other data.

The parameter control unit 125 selects or determines values for a variety of parameters regarding multi-connections.

For example, the parameter control unit 125 may select, based on the collected state information on each narrowband network, a protocol to be utilized for each network from among the TCP and the UDP. The parameter control unit 125 may calculate, when selecting the protocol, energy efficiency for each network in case of utilizing the TCP and in case of utilizing the UDP, and then utilize the calculated result as a ground for the selecting of the protocol, but not limited to those.

Further, the parameter control unit 125 may determine an amount of data to be transmitted or received through each of the multiple narrowband networks. Herein, the amount of the data to be transmitted or received through each of the multiple narrowband networks may indicate the number of the source blocks that are transmitted or received through each network, but not limited to those.

Further, the parameter control unit 125 may determine a data size of the redundant data, for restoring a data loss, to be utilized through each narrowband network based on the collected state information on each narrowband network such as the PLR.

Furthermore, the parameter control unit 125 may determine quality of the video data to be received from the server 200.

Furthermore, the parameter control unit 125 may determine information on the one symbol size s.

Hereinafter, a process or a procedure allowing the multi-communication to be performed between the device 100 and the server 200 is described referring to FIG. 3.

Figure 3:
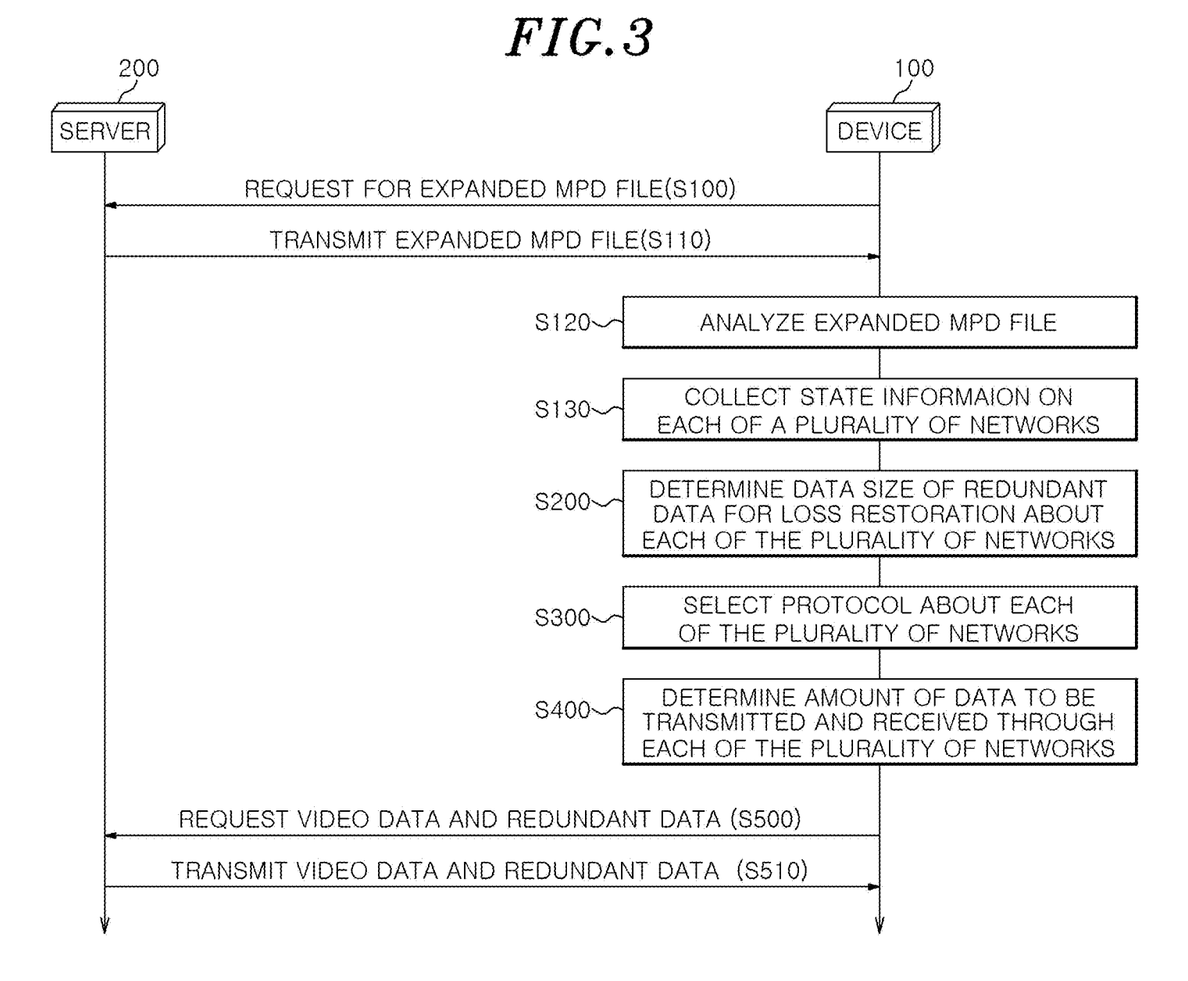
FIG. 3 shows a flowchart illustrating a communication process performed between a device with a multi-communication control device and a server in outline according to one embodiment.

In FIG. 3, a flowchart illustrating a multi-communication process or procedure therefor to be performed between the device 100 with the multi-communication control device 120 and the server 200 in outline according to one embodiment is illustrated.

Referring to FIG. 3 with FIG. 1 and FIG. 2, in a step S100, the device 100 requests the server 200 to transmit an expanded MPD file. Herein, the expanded MPD file indicates a file including not only an MPD file utilized in a well-known MPEG-DASH technique but also information on redundant data. For example, the expanded MPD file may include, as the information on the redundant data, an ID for resolution, the number of symbols "k" included in each source block, or a set of available numbers for the number of symbols, etc.

In this case, requesting the expanded MPD file in the step S100 may be performed through a network with the strongest signal among multiple networks existing between the device 100 and the server 200.

In a step S110, in response to the request of the step S100, the server 200 transmits the expanded MPD file to the device 100. Next, in a step S120, the packet parsing unit 122 parses the expanded MPD file received from the server 200 in the step S110 and the parameter control unit 125 analyzes the parsed expanded MPD file.

On the other hand, in a step S130, apart from or with the steps S100 through S120, the network monitor unit 126 collects state information on each of multiple narrowband networks existing between the device 100 and the server 200. As previously described, collectible information for each of the multiple narrowband networks may include at least one of a throughput, a Round Trip Time (RTT), and a packet loss rate (PLR.)

Next, in a step S200, the parameter control unit 125 determines a data size of the redundant data for each narrowband network based on at least one of the result analyzed in the step S120 and the state information collected in the step S130.

Further, in a step S300, the parameter control unit 125 selects a protocol to be utilized through each network from among a TCP and an UDP based on at least one of the result analyzed in the step S120, the state information collected in the step S130, and the data size of the redundant data determined in the step S200. In this case, as previously described, a result of calculating energy efficiency for each network in case of utilizing the TCP and in case of utilizing the UDP may be a ground for the process for selecting the protocol.

Furthermore, in a step S400, the parameter control unit 125 determines an amount of data transmitted and received through each of the multiple narrowband networks. In the determining process of the step S400, at least one of the result analyzed in the step S120, the state information collected in the step S130, the data size of the redundant data determined in the step S200, and information on the protocol selected in the step S300 may be considered as a ground. Further, in the determining process, a predetermined algorithm minimizing, when data is transmitted through the multiple networks, a total amount of energy consumption may be utilized.

On the other hand, in the steps S200 through S400, a quality of video data or a symbol size "s" may be determined although those are not illustrated in FIG. 3, thus determining the quality and the "s," and the steps S200 through S400 will be described in FIG. 5 in more detail.

Next, in a step S500, the device 100 requests the video data and the redundant data with the data size determined in the step S200.

In a step S510, in response to the request of the step S500, the server 200 transmits, to the device 100, the video data and the redundant data for the video data through parts of or all the multiple networks.

Then the packet parsing unit 121 parses the video data and the redundant data received in the step S510 and the decoder 124 decodes the parsed video data although those are not described in FIG. 3. The decoded video data is reproduced on the device 100.

On the other hand, in some instances, data loss may occur in parts of the video data received in the step S510. If an amount of lost data of the video data is less than predetermined threshold, the raptor decoder 123 restores the lost data of the video data by executing raptor decoding based on the redundant data parsed by the packet parsing unit 122. Herein, since the raptor decoding process based on the redundant data itself is a prior art, a detailed description thereof is omitted.

Alternatively, if the amount of the lost data of the video data is the predetermined threshold or more, the lost data of the video data may be restored based on a NACK-based-retransmission technique according to one embodiment. Since the NACK-based-retransmission technique itself is a prior art, a description thereof is omitted.

Figure 4:
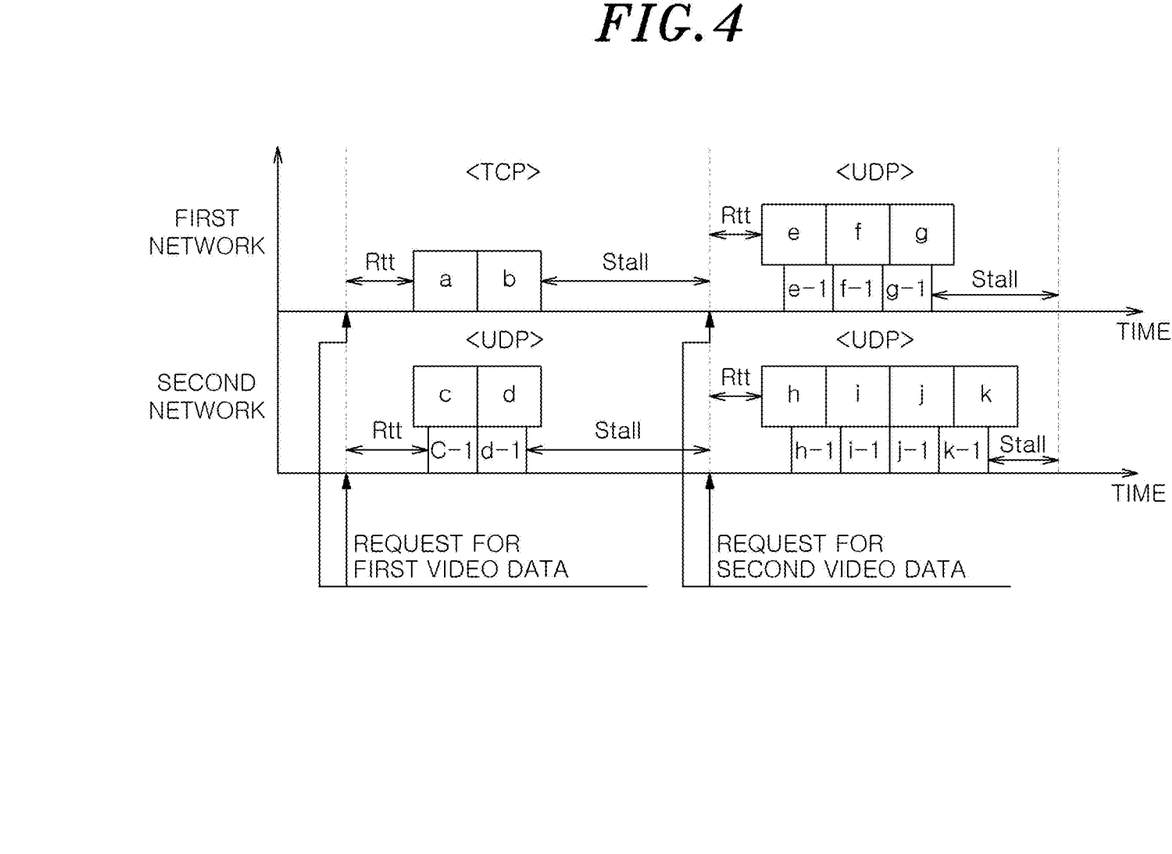
FIG. 4 illustrates data transmitted through each of multiple networks when communication between a device and a server is performed through the multiple networks as an example according to one embodiment.

Video data and redundant data which are transmitted through two networks (a first network and a second network) between the device 100 and the server 200 are conceptually illustrated in FIG. 4.

First of all, it is described that the device 100 requests the server 200 to transmit first video data. Through the first network during a segment download duration, the first video data a, b are transmitted (or downloaded at the device 100) after a Round Trip Time (RTT) or a HTTP request duration. Next, waiting occurs during a stall duration.

Further, through the second network during the segment download duration, the first video data c, d and redundant data c-1 and d-1 are transmitted (or downloaded at the device 100) after the RTT. Next, waiting occurs during the stall duration.

Next, it is described that the device 100 requests the server 200 to transmit second video data. Through the first network during the segment download duration, the second video data e, f, g and redundant data e-1, f-1, and g-1 are transmitted (or downloaded at the device 100) after the RTT. Next, waiting occurs during the stall duration.

Further, through the second network during the segment download duration, the second video data h, I, j, k and redundant data h-1, i-1, j-1, and k-1 are transmitted (or downloaded at the device 100) after the RTT. Next, waiting occurs during the stall duration.

On the other hand, hereinafter, the steps S200 through S400 and a process determining a quality of the video data or a symbol size "s" are described referring to FIG. 5. Note that step S200 in FIG. 3 and S200 in FIG. 5 represent the same step that determines a data size of the redundant data. Furthermore, step S300 in FIG. 3 and S300 in FIG. 5 represent the same step that selects a protocol to be utilized through each network from among a TCP and an UDP. Moreover, step S400 in FIG. 3 and S400 in FIG. 5 represent the same step that determines an amount of data transmitted and received through each of the multiple narrowband networks.

Figure 5:
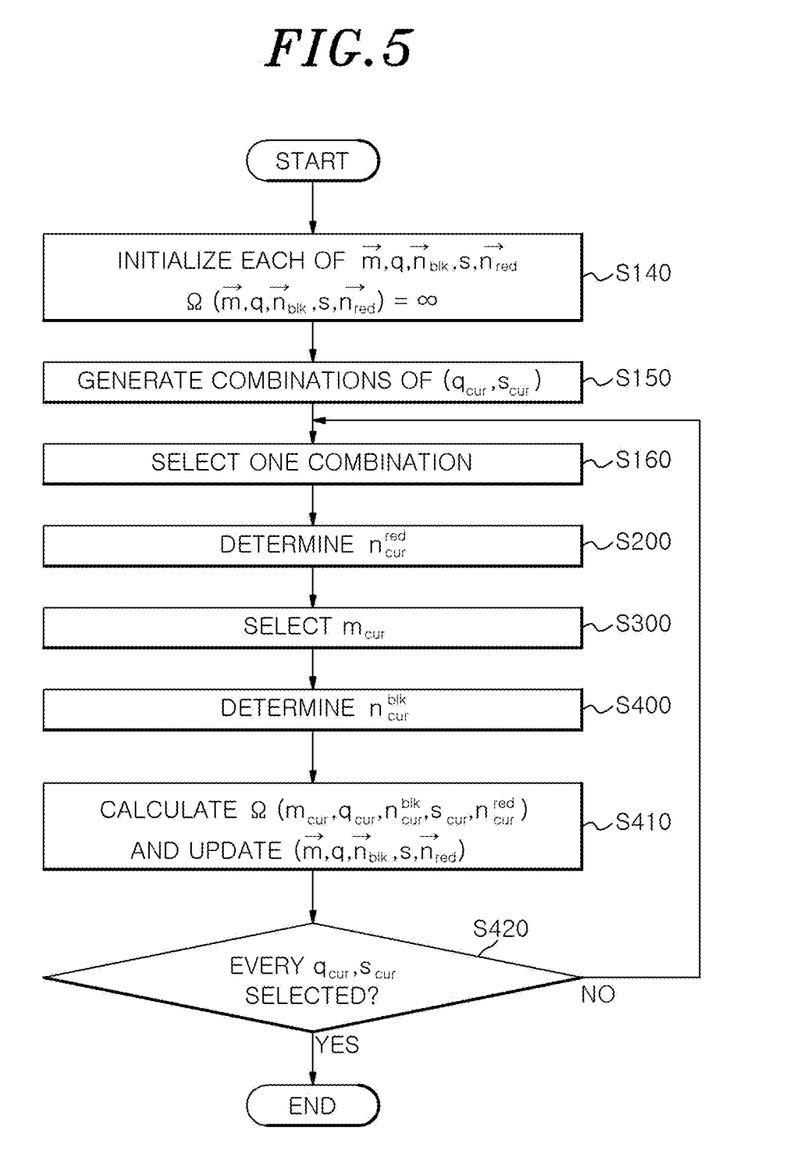
FIG. 5 shows a flowchart illustrating a process, performed by a multi-communication control unit, determining values of predetermined parameters according to one embodiment.

FIG. 5 shows a flowchart illustrating a process, performed by the multi-communication control device 125, determining values of predetermined parameters according to one embodiment. Herein, the parameters, illustrated in FIG. 5, to be determined may include a protocol "$\vec{m}$" to be utilized through each network, a quality "q" for video data, an amount of data "$\vec{n}_{blk}$" to be transmitted or received through the each network, a symbol size "s" and a data size of redundant data "$\vec{n}_{red}$" for the each network.

Referring to FIG. 5, in a step S140, initialization for each of $\vec{m}$, q, $\vec{n}_{blk}$, s, and $\vec{n}_{red}$ is performed, and a value of a cost function $\Omega(\vec{m}, q, \vec{n}_{blk}, s, \vec{n}_{red})$ is initialized to infinity. Each of the parameters and the cost function $\Omega(\vec{m}, q, \vec{n}_{blk}, s, \vec{n}_{red})$ will be described later.

Next, in a step S150, all available combinations of the quality q for the video data and the symbol size s are generated. In this case, available numbers for the symbol size s may be acquired from an expanded MPD file received from the server 200.

Next, in a step S160, one combination is selected from among the available combinations of q and s generated in the step S150.

Next, in the step S200, $\vec{n}_{red}^{cur}$ is determined based on a data size determining algorithm for the redundant data. The data size determining algorithm for the redundant data will be described later.

Next, in the step S300, after setting an arbitrary value for $n_i^{blk}$, $\vec{m}_{curr}$ is determined by comparing energy efficiency in case of utilizing a TCP with energy efficiency in case of utilizing an UDP. The energy efficiency will be described later.

Next, in the step S400, $\vec{n}_{blk}^{cur}$ is determined based on a block scheduling algorithm. The block scheduling algorithm will be described later.

Next, in a step S400, $\Omega(\vec{m}, q, \vec{n}_{blk}, s, \vec{n}_{red})$ is calculated to update. If a value of $\Omega(\vec{m}_{cur}, q_{cur}, \vec{n}_{cur}, s_{cur}, \vec{n}_{blk}^{red})$ is larger than a value of $\Omega(\vec{m}, q, \vec{n}_{blk}, s, \vec{n}_{red})$ and meets a limited condition, $(\vec{m}, q, \vec{n}_{blk}, s, \vec{n}_{red})$ is updated into $(\vec{m}_{cur}, q_{cur}, \vec{n}_{blk}^{cur}, s_{cur}, \vec{n}_{blk}^{red})$.

Next, in a step S420, it is performed that determining whether previous steps S140 through S160, S200 through S410 are performed for every combination of q and s. If the previous steps S140 through S160, S200 through S410 are performed for every combination, the process of FIG. 5 ends, however, if the previous steps S140 through S160, S200 through S410 are not performed for every combination of q and s, the step S420 proceeds to the step S160.

Hereinafter, details described the step S140 through the S410 is described.

First of all, the cost function $\Omega(\vec{m}, q, \vec{n}_{blk}, s, \vec{n}_{red})$ may be defined as a following equation 1.

$$\Omega(\vec{m}, q, \vec{n}_{blk}, s, \vec{n}_{red}) = \sum_{i=1}^{N_{net}} e_i^{eff}(m_i, q, n_i^{blk}, s, n_j^{red}) \quad \text{[equation 1]}$$

Herein, $\vec{m}$ may be expressed as a following equation 2.

$$\vec{m} = (m_1, m_2, \ldots, m_{N_{net}}) \quad \text{[equation 2]}$$

$$m_i = \begin{cases} 1 & \text{if } TCP \text{ is selected for } i\text{-th network,} \\ 0 & \text{otherwise } (UDP \text{ is selected for } i\text{-th networks)}. \end{cases}$$

Further, $\vec{n}_{blk}$ may be expressed as a following equation 3.

$$\vec{n}_{blk} = (n_1^{blk}, n_2^{blk}, \ldots, n_{N_{net}}^{blk}) \quad \text{[equation 3]}$$

In the equation 3, $n_i^{blk}$ indicates the number of source blocks to be requested through an i-th network. The total number of source blocks of a j-th segment of the video data with the quality q may be defined as a following equation 4.

$$n_{j,q}^{blk} = \left\lceil \frac{B_{j,q}}{s \cdot k} \right\rceil = \sum_{i=1}^{N_{net}} n_i^{blk} \quad \text{[equation 4]}$$

Further, a vector for the redundant data $\vec{n}_{red}$ may be expressed as a following equation 5.

$$\vec{n}_{red} = (n_1^{red}, n_2^{red}, \ldots, n_{N_{net}}^{red}) \quad \text{[equation 5]}$$

In the equation 5, $n_i^{red}$ indicates the data size of the redundant data required for the source blocks requested through the i-th network.

Next, the energy efficiency $e_i^{eff}(m_i, q, n^{blk}, s, n_i^{red})$ for the i-th network in the equation 1 is calculated under a following equation 6.

$$e_i^{eff}(m_i, q, n_i^{blk}, s, n_i^{red}) = \quad \text{[equation 6]}$$

$$\frac{v(q)}{e_i^{recv}(m_i, q, n_i^{blk}, s, n_i^{red}) + (1 - m_i) \cdot n_i^{blk} \cdot e_{dec}(s)}$$

In the equation 6, $e_i^{recv}(m_i, q, n_i^{blk}, s, n_i^{red})$ indicates an amount of energy consumption at an i-th network interface during a segment request round. $e_{dec}(s)$ indicates the amount of the energy consumption for raptor decoding for a source block when data is transmitted through the UDP on the i-th network. $v(q)$ indicates a bit rate of video segment at the video quality level q.

In this case, determining of $\vec{m}$, q, $\vec{n}_{blk}$, s, and $\vec{n}_{red}$ is required to meet a condition described following equations 7 and 8.

$$\max_{1 \leq i \leq N_{net}} \{\phi_i^{dec}(s, n_i^{red})\} \leq \Phi_{dec}^{max} \quad \text{[equation 7]}$$

$$\max_{1 \leq i \leq N_{net}} \{t^{wait}(s, k) + t^{enc}(s, k, c) + t_i^{rtt} + \quad \text{[equation 8]}$$

$$t_i^{recv}(m_i, q, n_i^{blk}, s, n_i^{red}) + (1 - m_i) \cdot t_{dec}(s)\} \leq \varepsilon \cdot t_{buf}$$

The equations 7 and 8 indicate that a sufficient amount of the redundant data is required to be requested to restore lost data in case of utilizing the UDP for the i-th narrowband network. $\phi_i^{dec}(s, n_i^{red})$ indicates a failure rate of the raptor decoding for a raptor encoding block received through the i-th network and is required to be smaller than an allowable maximum failure rate $\Phi_{dec}^{max}$ of the raptor decoding. $t_{dec}(s)$ indicates a time required for the raptor decoding in case of utilizing the UDP for the i-th network, $t_i^{eff}$ indicates an RTT of the i-th network, and $t_{buf}$ indicates a buffered video time at a client. $\varepsilon^{(0 < \varepsilon \leq 1)}$ indicates a margin value that is required to avoid buffer underflow occurring by an error of prediction for network states. $t^{wait}(s, k)$ indicates a time required to collect the video data to perform the raptor encoding at a transmission buffer and $t^{enc}(s, k, c)$ indicates a time required for the raptor encoding of the collected video data.

In other words, the equation 7 indicates that the sufficient amount of the redundant data is required to be requested to restore the lost data when the UDP is utilized for the i-th network.

Further, the equation 8 indicates that the source block is required to be transmitted before the buffer underflow occurs at a receiving buffer. Generally, the larger a source block size (s*k) is, the smaller overhead to restore the lost data becomes. However, because the bit rate of the encoded video data that is available to be transmitted is significantly limited under a narrowband, an excessive delay may occur to collect the video data to be raptor-encoded at the transmission buffer if the source block size becomes larger. Therefore, for reliable transmission through a raptor code under the narrowband, the time required to collect the video data to be raptor-encoded at the transmission buffer is required to be considered depending on the source block size with a transmission delay and a delay for the raptor encoding/decoding.

Hereinafter, the data size determining algorithm for the redundant data and the block scheduling algorithm are described.

<Data Size Determining Algorithm for the Redundant Data>

The data size of the redundant data is determined by a PLR of the network, and the PLR is differently calculated based on the selected protocol. First of all, when segment data is received through the TCP, the PLR of the i-th network may be estimated based on a TCP throughput model like a following equation 9.

$$plr_i = \left(\frac{MSS \cdot C}{tr_i^{tcp} \cdot t_j^{rtt}}\right)^2 \quad \text{[equation 9]}$$

In the equation 9, MSS indicates a maximum segment size, C is a constant, and $tr_i^{tcp}$ indicates a throughput measured when data is received through the TCP. When the segment data is received in case of utilizing the UDP, the present disclosure may easily estimate the PLR by identifying sequences of received packets by utilizing a Spike method. Based on those described above, after a current segment request round, a throughput for a next segment request round is estimated as a following equation 10.

$$tr_i = \quad \text{[equation 10]}$$

$$\begin{cases} m_i \cdot tr_i^{tcp} + (1-m_i) \cdot tr_i^{tcp} \cdot \frac{t_i^{rtsq}}{\sqrt{t_i^{rtt}}} & \text{when TCP is utilized,} \\ m_i \cdot \frac{MSS \cdot C}{t_i^{rtt} \cdot \sqrt{plr_i}} + (1-m_i) \cdot tr_i^{udp} & \text{when UDP is utilized,} \end{cases}$$

In the equation 10, $t_i^{rttsq}$ is a long-term average of the square of root of $t_i^{rtt}$ and $tr_i^{udp}$ is a throughput measured in case of utilizing the UDP. A throughput for the UDP in case of utilizing the TCP is estimated through a TFRC-based model.

The failure rate of the raptor decoding for the raptor encoding block is calculated as follows.

$$\phi_i^{dec}(s, n_i^{red}) = P(X_i < n_{min} | X \sim B(n_i^{recv}, 1 - plr_i)) = \quad \text{[equation 11]}$$

$$\sum_{l=0}^{n_{min}-1} \left(\binom{n_i^{recv}}{l}(1-plr_i)^l (plr_i)^{n_i^{recv}-l}\right)$$

$$n_{min} = \left\lceil \frac{s \cdot k \cdot (1+\delta_k)}{S_{pkt}} \right\rceil \quad \text{[equation 12]}$$

$$n_i^{recv} = (n_{src} + n_i^{red}) \cdot (1 - plr_i) \quad \text{[equation 13]}$$

$$n_{src} = \left\lceil \frac{s \cdot k}{S_{pkt}} \right\rceil \quad \text{[equation 14]}$$

In the equations 11 through 14, $X_i$ indicates a random variable meaning the number of packets successfully received through the i-th network, and $n_{min}$ indicates is the number of minimum packets required for successful raptor decoding. Further, $\delta_k$ indicates minimum symbol overhead for the number of source symbols k. $n_i^{recv}$ indicates the number of packets that are successfully received through the i-th network and $n_{src}$ indicates the number of packets required to transmit one source block. If the number of repetition packets to be transmitted through the i-th network, redundant data $n_i^{red}$ is calculated from a following equation 15 through those described above, the number of total packets $n_{req}$ (i.e., $n_{src}+n_i^{red}$) that the server 200 is requested to transmit is acquired through following equations 16 and 17.

$$n_i^{red} = n_{req} - n_{src} \quad \text{[equation 15]}$$

$$n_{req} = \underset{n_{min} \leq n \leq 2n_{max}}{\arg\min}\{p_{diff}(n)\} \quad \text{[equation 16]}$$

$$p_{diff}(n) = \begin{cases} \Phi_{dec}^{max} - \phi_i^{dec}(s, n) & \text{if } \phi_i^{dec}(s, n) \leq \Phi_{dec}^{max}, \\ \infty & \text{otherwise,} \end{cases} \quad \text{[equation 17]}$$

<Block Scheduling Algorithm>

The block scheduling algorithm determines an amount of data $\vec{n}_{blk}$ received through each wireless network to minimize energy consumption (that is calculated through a following equation 18) at all network interfaces based on the determined $\vec{m}$, q, s, and $\vec{n}_{red}$. Further, $\vec{n}_{blk}$ that maximizes a value of the cost function of the equation 18 is determined under a condition defined by following equations 19 and 20.

$$\sum_{i=1}^{N_{net}} \tilde{e}_{net_i}^{recv}(n_i^{blk}) \quad \text{[equation 18]}$$

$$n_{j,q}^{blk} = \sum_{i=1}^{N_{net}} n_i^{blk} \quad \text{[equation 19]}$$

$$0 \leq n_i^{blk} \leq \frac{(\varepsilon \cdot t_{buf} - t_i^{rtt}) \cdot tr_i}{s \cdot k} \text{ for } 1 \leq i \leq N_{net} \quad \text{[equation 20]}$$

In the equations 18 and 19, $\tilde{e}_{net_1}^{recv}(n_i^{blk})$ indicates the energy consumption at network interfaces through the i-th network when $\vec{m}$, q, s, and $\vec{n}_{red}$ are provided. Herein, since determining a value of $\tilde{e}_{net_1}^{recv}(n_i^{blk})$ is a prior art, a description thereof is omitted.

As previously described, according to one embodiment, the TCP or the UDP is selected and utilized for each of multiple networks between a device and a server. In this case, if the UDP is selected, restoration for lost packets is available without retransmission of the lost packets because a raptor code is applied for reliable data transmission. Further, an energy-efficient streaming service becomes available through an energy consumption model of a network interface and a raptor decoder.

Further, the method of the present disclosure described previously may be implemented in a computer-readable storage medium including a computer program instructions to perform respective steps included in the method or implemented in the computer program instructions, included in the computer-readable storage medium, to perform respective steps included in the method.

The above description illustrates the technical idea of the present invention, and it will be understood by those skilled in the art to which this present invention belongs that various changes and modifications may be made without departing from the scope of the essential characteristics of the present invention. Therefore, the exemplary embodiments disclosed herein are not used to limit the technical idea of the present invention, but to explain the present invention, and the scope of the technical idea of the present invention is not limited by those embodiments. Therefore, the scope of protection of the present invention should be construed as defined in the following claims, and all technical ideas that fall within the technical idea of the present invention are intended to be embraced by the scope of the claims of the present invention.

What is claimed is:

1. An apparatus for adaptive streaming in multiple narrowband wireless communication environment, the apparatus comprising:
    a communication processor configured to perform multi-communication with a server using at least one of a transmission control protocol (TCP) and a user datagram protocol (UDP);
    a network monitoring processor configured to collect state information on each of a plurality of narrowband networks; and
    a parameter controller configured to:
        based on the collected state information on each of the plurality of narrowband networks, select a quality of video segment to be requested from the server, and select the TCP or the UDP for each and every one of the plurality of narrowband networks for multi-communication with the server; and
        determine a data size of redundant data for data loss restoration for each of the plurality of narrowband networks,
        wherein the parameter controller is further configured to determine, based on the data size of the redundant data determined for each of the plurality of narrowband networks, an amount of data to be transmitted and received through each of the plurality of narrowband networks, and wherein the amount of the data to be transmitted and received for each of the plurality of narrowband networks is determined by utilizing a predetermined algorithm minimizing a total amount of energy consumed when the data is transmitted through the plurality of narrowband networks.

2. The apparatus of claim 1, wherein the collected state information includes at least one of a throughput, a round trip time (RTT), and a packet loss rate (PLR) for each of the plurality of narrowband networks.

3. The apparatus of claim 1, wherein the parameter controller is further configured to:
    calculate energy efficiency in case of utilizing the TCP and energy efficiency in case of utilizing the UDP for each of the plurality of narrowband networks based on the collected state information, and
    select the TCP or the UDP to be utilized for each of the plurality of narrowband networks based on comparing the calculated results.

4. The apparatus of claim 1, wherein the parameter controller is configured to determine the data size of the redundant data based on a packet loss rate collected by the network monitoring processor.

5. An adaptive streaming method performed by the apparatus of claim 1, the method comprising:
    collecting the state information on each of the plurality of narrowband networks;
    selecting the TCP or the UDP for each and every one of the plurality of narrowband networks for multi-communication with the server based on the collected state information; and
    determining the data size of the redundant data for data loss restoration for each of the plurality of narrowband networks.

6. The adaptive streaming method of claim 5, wherein the collected state information includes at least one of a throughput, a round trip time (RTT), and a packet loss rate (PLR) for each of the plurality of narrowband networks.

7. The adaptive streaming method of claim 5, wherein the selecting includes:
    calculating energy efficiency in case of utilizing the TCP and energy efficiency in case of utilizing the UDP for each of the plurality of narrowband networks based on the collected state information; and
    selecting the TCP or the UDP to be utilized for each of the plurality of narrowband networks based on comparing the calculated results.

8. The adaptive streaming method of claim 5, wherein the data size of the redundant data is determined based on a collected packet loss rate and a receiving buffer size to satisfy a seamless reproducing condition in the narrowband networks.

9. The adaptive streaming method of claim 5, further comprising:
    determining, based on the data size of the redundant data determined for each of the plurality of narrowband networks, the amount of data to be transmitted and received through each of the plurality of narrowband networks.

10. The adaptive streaming method of claim 9, wherein the amount of the data to be transmitted and received for each of the plurality of narrowband networks is determined by utilizing the predetermined algorithm minimizing the total amount of energy consumed when the data is transmitted or received through each of the plurality of narrowband networks.

11. A non-transitory computer-readable storage medium storing a computer program, the computer program programmed to cause the apparatus of claim 1 to:
    collect the state information on each of the plurality of narrowband networks;
    select the TCP or the UDP for each and every one of the plurality of narrowband networks for multi-communication with the server based on the collected state information; and determine the data size of the redundant data for data loss restoration for each of the plurality of narrowband networks.

12. The apparatus of claim 1, wherein the parameter controller is configured to determine the data size of the redundant data based on a collected packet loss rate and a receiving buffer size to satisfy a seamless reproducing condition in the narrowband networks.

* * * * *